(12) United States Patent
Kotani et al.

(10) Patent No.: US 8,125,608 B2
(45) Date of Patent: Feb. 28, 2012

(54) BOARD FOR DISPLAY DEVICE AND DISPLAY DEVICE

(75) Inventors: Naoki Kotani, Sakai (JP); Kimio Takahashi, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 482 days.

(21) Appl. No.: 12/296,905

(22) PCT Filed: Feb. 9, 2007

(86) PCT No.: PCT/JP2007/052363
§ 371 (c)(1),
(2), (4) Date: Oct. 10, 2008

(87) PCT Pub. No.: WO2007/129489
PCT Pub. Date: Nov. 15, 2007

(65) Prior Publication Data
US 2009/0279039 A1    Nov. 12, 2009

(30) Foreign Application Priority Data
Apr. 11, 2006 (JP) ................................. 2006-109128

(51) Int. Cl.
*G02F 1/1333* (2006.01)
*G02F 1/1339* (2006.01)
(52) U.S. Cl. ...................................... 349/153; 349/122

(58) Field of Classification Search ................. 349/153, 349/122
See application file for complete search history.

(56) References Cited

U.S. PATENT DOCUMENTS

| | | | |
|---|---|---|---|
| 6,124,917 A * | 9/2000 | Fujioka et al. | 349/153 |
| 2002/0163611 A1 * | 11/2002 | Kamijima et al. | 349/122 |
| 2004/0246420 A1 * | 12/2004 | Morimoto et al. | 349/124 |

FOREIGN PATENT DOCUMENTS

| | | |
|---|---|---|
| JP | 4-147218 A | 5/1992 |
| JP | 11-133406 A | 5/1999 |
| JP | 11-167125 A | 5/1999 |
| JP | 2004-361623 A | 12/2004 |

* cited by examiner

*Primary Examiner* — Mark Robinson
*Assistant Examiner* — Jerry Blevins
(74) *Attorney, Agent, or Firm* — Birch, Stewart, Kolasch & Birch, LLP

(57) ABSTRACT

A substrate for a display having, on a surface thereof, a sealing compound disposed along a periphery of the substrate spaced at a predetermined interval from an outer edge of a display part to which an oriented film is applied; and a convex portion or/and a concave portion, for preventing the applied oriented film from spreading to the sealing compound, provided between the sealing compound and the outer edge of the display part. The convex portion has a configuration of a bank continuous or uncontinuous, whereas the concave portion is formed as a plurality of independent portions arranged side by side or dotted between the outer edge of the display part and the sealing compound.

7 Claims, 13 Drawing Sheets

[Prior Art]

[Prior Art]

BOARD FOR DISPLAY DEVICE AND DISPLAY DEVICE

BACKGROUND OF THE INVENTION

1. Field Of The Invention

The present invention relates to a substrate for a display and the display having the substrate. More particularly, in substrates preferably used as a TFT substrate and a color filter substrate opposed thereto with a liquid crystal interposed therebetween in a liquid crystal display, the present invention is intended to prevent the spread of an oriented film applied to a surface of the substrate so that the oriented film is prevented from reaching a sealing compound disposed on the periphery of a display part to seal the gap between the substrates and positions of electrodes mounted on the opposed substrates with the electrodes connected to each other.

2. Description Of The Related Art

In recent years, as a display such as monitors of televisions, personal computers, and the like, thin and flat FPD (Flat Panel Display) is frequently used. Among various kinds of the FPD, a plasma display and a liquid crystal display are mainly used.

As shown in FIG. 16, in a color liquid crystal display, normally, matrix-shaped transparent electrodes 2A, 2B and oriented films 3A, 3B having liquid crystal oriented in a predetermined direction are disposed at an inner side of substrates 1A, 1B respectively. A liquid crystal material 4 is enclosed between the oriented films 3A and 3B, and a sealing compound 7 is disposed in the region between the outer edges of the display part of the substrates 1A, 1B and the outer edges of the substrates 1A, 1B to seal the liquid crystal material 4 in the region. Polarizing plates 5A, 5B are bonded to the outer surfaces of the substrates 1A, 1B respectively. Color filters 6 of R, G, and B are disposed between the display-side substrate 1B and the transparent electrode 2B.

As shown in FIG. 17, a driver (not shown) for driving the transparent electrodes 2A, 2B provided on the substrates 1A, 1B respectively is connected to the substrate 1A. A common electrode 8 connected with the driver is disposed on the periphery of the display part of the substrate 1A and connected with the transparent electrode 2B of the substrate 1B through a conductive material 9. A distributing wire (not shown) for connecting the driver and the transparent electrode 2A of the substrate 1A to each other is disposed on the periphery of the display part of the substrate 1A.

As described above, the sealing compound 7 is disposed in the region between the outer edges of the display part of the substrates 1A, 1B and the outer edges of the substrates 1A, 1B. A connection electrode to be connected with a common electrode 8A at the substrate 1A and a connection electrode to be connected with a common electrode 8B at the substrate 1B are disposed at the substrates 1A, 1B respectively.

At the step of forming the display having the above-described construction, before the substrates 1A, 1B are combined with each other with the substrates 1A, 1B opposed to each other, wiring is carried out at each of the substrates 1A, 1B. Thereafter a resin solvent forming an oriented film is applied. After the resin solvent is dried, the substrates 1A, 1B are combined with each other through the sealing compound 7.

At the above-described step, the oriented films 3A, 3B are formed by applying a resin solvent mainly to the surface of a display portion X disposed at the surface side of the transparent electrodes 2A, 2B of the substrates 1A, 1B by an ink jet method. The viscosity of the resin solvent to be formed as the oriented films 3A, 3B is set comparatively low so that the resin solvent has favorable wettability and spreads uniformly.

Therefore it is very difficult to control the dimension of the outer edge of the display portion X when the resin solvent is applied. The resin solvent is liable to spread beyond the outer edge of the display portion X before it dries and solidifies. Thus there is a fear that the resin solvent reaches the position where the sealing compound is disposed and the position where the common electrode 8 is disposed.

In that case, when the spread oriented film dries and solidifies and is present on the surface of the display portion X where the sealing compound 7 is disposed, the oriented film is present on the lower surface of the sealing compound 7. As a result, the sealing compound is liable to peel off the substrates 1A, 1B. Thus the reliability in the performance of the oriented film in sealing the substrates 1A, 1B is lost. When the oriented film is present on the surface of the common electrode 8, continuity between the common electrode 8 and the connection electrode at the substrate 1B side is liable to become poor.

To solve the above-described problem, as disclosed in Japanese Patent Application Laid-Open No. 2004-361623 (patent document 1), the liquid crystal display 10 shown in FIG. 18 is proposed. In the liquid crystal display 10, the organic insulation film 12 is formed on the surfaces of the substrates 11 opposed to each other, and the oriented film 13 is applied to the surface of the organic insulation film 12. One continuous groove 12a is formed on the organic insulation film 12 along the outer edge of the display part. The applied solvent for the oriented film 13 is collected in the groove 12a to prevent the solvent from spreading to the sealing compound 14 beyond the groove 12a.

But in the apparatus proposed in the patent document 1, because the organic insulation film 12 is thin, the groove 12a that can be formed on the organic insulation film 12 is very shallow. Thus there is a high possibility that the applied oriented film 13 spreads beyond the groove 12a and reaches the sealing compound 14. When the groove 12a is formed deep to solve this problem, it is necessary to thicker the organic insulation film 12, which leads to a high cost and a low productivity.

In the patent document 1, one groove 12a is shown. Thus considering that the groove 12a is shallow, the effect of restraining the spread of the oriented film is very low.

Patent document 1: Japanese Patent Application Laid-Open No. 2004-361623

SUMMARY OF THE INVENTION

Problem to be Solved by the Invention

The present invention has been made in view of the above-described problems. It is an object of the present invention to securely prevent the spread of an oriented film applied to a surface of a substrate so that the oriented film does not reach a sealing compound provided on the periphery of a display part and electrodes.

Means for Solving the Problem

To solve the above-described problems, firstly, the present invention provides a substrate for a display having:

on a surface of the substrate, a sealing compound disposed along a periphery of the substrate spaced at a predetermined interval from an outer edge of a display part to which an oriented film is applied; and a convex portion or/and a concave portion, for preventing the applied oriented film from spreading to the sealing compound, provided between the sealing compound and the outer edge of the display part, wherein the convex portion has a configuration of a bank continuous or uncontinuous; and the concave portion is formed as a plurality of independent portions arranged side by side or dotted between the outer edge of the display part and the sealing compound.

The convex portion or/and the concave portion are made of a resin film provided between the sealing compound and the outer edge of the display part. The resin film may be made of the same resin material as that for the oriented film. The resin material for the resin film is not limited to the same resin material as that for the oriented film, but other appropriate resin can be adopted so long as the resin material is an insulation resin.

In forming the convex portion, the resin is applied to the upper surface of the substrate to form only the convex portion thereon. In forming the groove, while the groove is being formed, the resin is applied to the upper surface of the substrate.

As described above, in the present invention, before the oriented film is applied to the display part, the convex portion or/and the concave portion having the above-described configuration are formed between the outer edge of the display part and the region where the sealing compound is disposed.

In detail, it is possible to freely set the height of the convex portion to be formed in the shape of a bank between the display part and the sealing compound in the range of the length of the gap between the substrates opposed to each other. That is, it is possible to set the height of the convex portion to such an extent that the flow of the oriented film can be securely intercepted. More specifically, the gap between the substrates opposed to each other is normally about three microns. Thus the height of the convex portion of the present invention is much larger than the depth of the groove formed on the thin insulation material described previously as a conventional art. Thereby the convex portion is capable of intercepting the spread of the oriented film from the display part toward the sealing compound.

When the concave portion is formed between the display part and the sealing compound, the concave portion is formed as a plurality of dotted independent portions. Thus even though the oriented film rides across one concave portion while it is spreading, it enters other concave portion. Thus much time is required for the oriented film to reach the position where the sealing compound is disposed. Thereby it is possible to prevent the spread of the oriented film.

It is preferable to arrange the convex portion and the concave portion side by side. For example, when the concave portion is formed adjacently to the convex portion at the side of the display part side thereof, the formed concave portion is similar to the formation of a bank having a height equal to the addition of the height of the convex portion and the depth of the concave portion. Thereby it is possible to more securely intercept the spread of the oriented film.

A substrate on which the convex portion or/and the concave portion are formed consists of one or both of the substrates opposed to each other with the sealing compound interposed therebetween.

More specifically, the substrates opposed to each other consist of a TFT array substrate and a color filer substrate opposed thereto with a liquid crystal interposed therebetween.

As described above, it is essential to form both the convex portion and the concave portion on the substrate from which the sealing compound is projected. When the sealing compound is projected from both of the opposed substrates, the convex portion and the concave portion are formed on both substrates. When the sealing compound is projected from only one of the opposed substrates, the convex portion and the concave portion may be formed on the one substrate. But the surface of the sealing compound contacts the other substrate on which the convex portion and the concave portion are not formed. Thus it is preferable to also form the convex portion and the concave portion on the other substrate.

By forming the convex portion or/and the concave portion for preventing the flow of the oriented film applied to both substrates opposed to each other, both substrates are capable of preventing contact between the oriented film and the sealing compound.

Secondly the present invention provides a substrate for a display having:

on a surface of the substrate, an electrode disposed along a periphery of the substrate spaced at a predetermined interval from an outer edge of a display part to which an oriented film is applied; and a convex portion or/and a concave portion, for preventing the applied oriented film from spreading to the electrode, provided between the electrode and the outer edge of the display part, wherein the convex portion has a configuration of a bank continuous or uncontinuous; and the concave portion is formed as a plurality of independent portions arranged side by side or dotted between the outer edge of the display part and the electrode.

The first aspect of the invention is so constructed that at the time of the application of the resin solvent to be formed as the oriented film, the resin solvent does not reach the sealing compound. But the second aspect of the invention is so constructed that the applied oriented film does not spread to the electrode disposed at a position of the periphery of the substrate spaced at a predetermined interval from the outer edge of the display part.

As the above-described electrode, a common electrode provided on the array substrate is exemplified. The common electrode is disposed between the outer edge of the display part to which the oriented film is applied and the sealing compound. When the oriented film is applied to the surface of the common electrode, the common electrode cannot be securely connected with a connection electrode disposed on the color filter substrate opposed to the array substrate. Therefore it is necessary to prevent the applied oriented film from reaching the electrode.

Similarly to the array substrate, the convex portion or/and the concave portion similar to those of the array substrate are formed on the color filter substrate to prevent the oriented film from spreading to the connection electrode.

Similarly to the first aspect of the invention, the convex portion or/and the concave portion are also formed in the second aspect of the invention to securely prevent the applied oriented film from spreading to the electrode. Therefore when a pair of the substrates is disposed in confrontation, the electrodes of both substrates can be securely connected to each other via a conductive material.

Similarly to the first aspect of the invention, the convex portion and the concave portion may be formed by applying the same resin as that for the oriented film or other resin in the second aspect of the invention. In the array substrate, it is preferable to dispose a wire constituted of the same distributing wire as that provided on the periphery of the display part as a dummy pattern and fix the wire to the substrate to form the convex portion.

By using the same distributing wire as that provided on the periphery of the display part, it is possible to form the convex portion for preventing the spread of the oriented film at the same step as the step of disposing the distributing wire, which is advantageous in not increasing the number of work steps.

At the portion where the electrode is disposed between the sealing compound and the outer edge of the display part, it is preferable to form the convex portion consisting of the distributing wire between the electrode and the outer edge of the display part and form the convex portion or/and the concave portion consisting of the resin material of the first aspect of the invention between the electrode and the sealing compound.

It is preferable that in the first and second aspects of the invention, the convex portion or/and the concave portion formed to prevent the spread of the applied oriented film are disposed within a region in which a black mask (BM) surrounding the outer edge of the display part is disposed such that the convex portion or/and the concave portion are present along an entire circumference inside the region.

In the above-described construction, because the convex portion or/and the concave portion are formed by effectively utilizing the region in which the black mask is disposed, it is unnecessary to form a space for forming the convex portion or/and the concave portion and possible to restrain an increase of the area of the periphery surrounding the display part of the display.

Instead of forming the convex portion and the concave portion for intercepting the flow of the resin solvent applied as the oriented film, the third invention restrains the flow of the oriented film as follows:

In the substrate of the third aspect of the invention for a display, on a surface of the substrate, a convex portion, a concave portion or/and a hole for restraining a flow of an oriented film applied to a display part are formed on a distributing wire disposed from an outer edge of the display part to a peripheral edge of the substrate.

In the third aspect of the invention, the flow of the applied oriented film is restrained by utilizing the distributing wire disposed from the outer edge of the display part to the peripheral edge of the substrate.

A problem which occurs at the position where the distributing wire is provided is that the gap between adjacent portions of the distributing wire arranged side by side serves as a duct and that the applied oriented film is liable to flow along the distributing wire and spread to the position where the sealing compound is disposed. To overcome the problem, the convex portion, the concave portion or/and the hole are formed on the insulation cover of the distributing wire so that the spread of the oriented film that flows along the distributing wire is restrained and that the oriented film which has flowed into the concave portion or/and the hole is stopped therein. Thereby the oriented film is prevented from reaching the position where the sealing compound is disposed and the position where the electrode is disposed.

It is possible to provide a substrate for a display having all of the constructions of the first, second, and third aspects of the invention.

That is, the substrate for a display has:
on a surface of the substrate,
a sealing compound disposed along a periphery of the substrate spaced at a predetermined interval from an outer edge of a display part to which an oriented film is applied; and
an electrode disposed between the sealing compound and the outer edge of the display part;
a distributing wire wired in a range from the display part to a peripheral edge of the substrate with the distributing wire disposed at both sides of the electrode;
a convex portion or/and a concave portion, for preventing the applied oriented film from spreading, provided between the electrode and the outer edge of the display part and between the sealing compound and the outer edge of the display part; and
a convex portion, a concave portion or/and a hole, for restraining the oriented film applied to the display part from flowing, provided on a portion of the distributing wire extended from the outer edge of the display part to the sealing compound.

The above-described construction prevents the oriented film applied to the display part from reaching the position where the sealing compound is disposed and the electrode, thus securely sealing the gap between the substrates opposed to each other and securely accomplishing electrical connection.

The present invention provides a display having the above-described substrate for the display.

Effect of the Invention

As described above, in the first aspect of the invention, there are provided the convex portion having the configuration of a bank continuous or uncontinuous and a plurality of the independent concave portions arranged side by side or dotted between the display part to which the oriented film is applied and the position where the sealing compound is disposed. Therefore it is possible to securely prevent the applied oriented film from spreading to the position where the sealing compound is disposed. Thereby it is possible to prevent the contact between the oriented film and the sealing compound and seal the gap between the substrates opposed to each other.

In the second aspect of the invention, between the display part and the electrode, there are provided the convex portion or/and a plurality of the concave portions similar to those of the first aspect of the invention. Therefore it is possible to prevent the applied oriented film from spreading to the electrode and securely connect the electrodes of a pair of the substrates opposed to each other via the conductive material when the substrates are disposed in confrontation. Thereby it is possible to enhance the reliability in the electrical connection.

In the third aspect of the invention, the convex portion, the concave portion or/and the hole are formed on the distributing wire disposed on the substrate. Thereby the distributing wire is capable of restraining the oriented film from flowing without using a separate additional member, thus preventing the oriented film from reaching the position where the sealing compound is disposed.

The construction having all of the constituent features of the first, second, and third aspects of the invention is capable of preventing the oriented film applied to the display part from spreading to the position where the sealing compound is disposed and the position where the electrode is disposed, improving the performance of sealing the gap between the substrates opposed to each other, and securely accomplish the electrical connection between the electrodes of both substrates opposed to each other.

DETAILED DESCRIPTION OF THE INVENTION

The embodiments of the present invention are described below with reference to the drawings.

Figure 1:
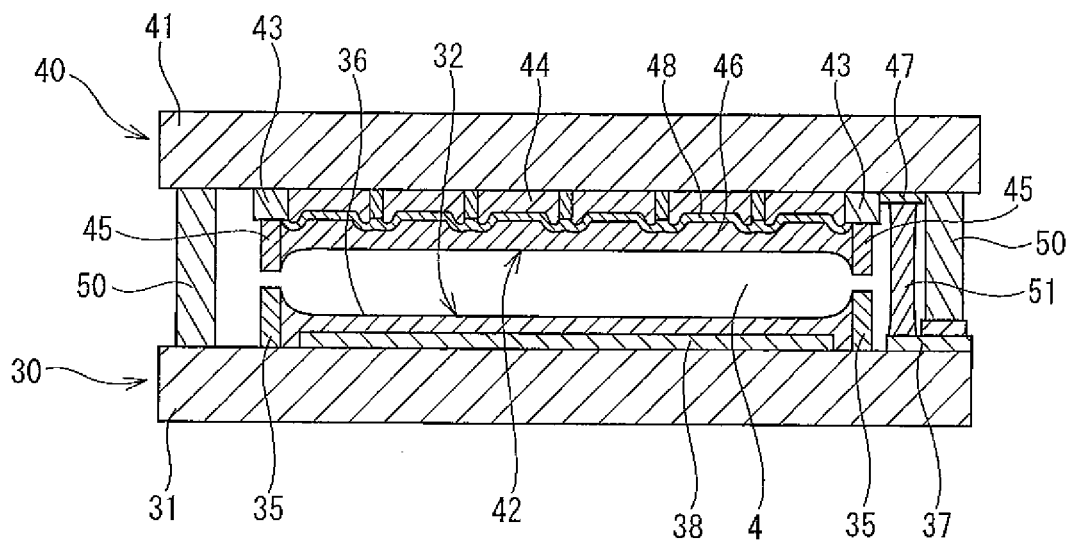
FIG. 1 is a schematic sectional view of assembled array and CF substrate for a display in a first embodiment of the present invention.

FIGS. 1 through 6 show a first embodiment of the present invention. FIG. 1 shows a state in which a TFT array substrate 30 (hereinafter abbreviated as array substrate 30) and a color filter substrate 40 (hereinafter abbreviated as CF substrate 40) are combined with each other by opposing the array substrate 30 and the CF substrate 40 to each other with a liquid crystal of a liquid crystal display interposed therebetween.

Figure 17:
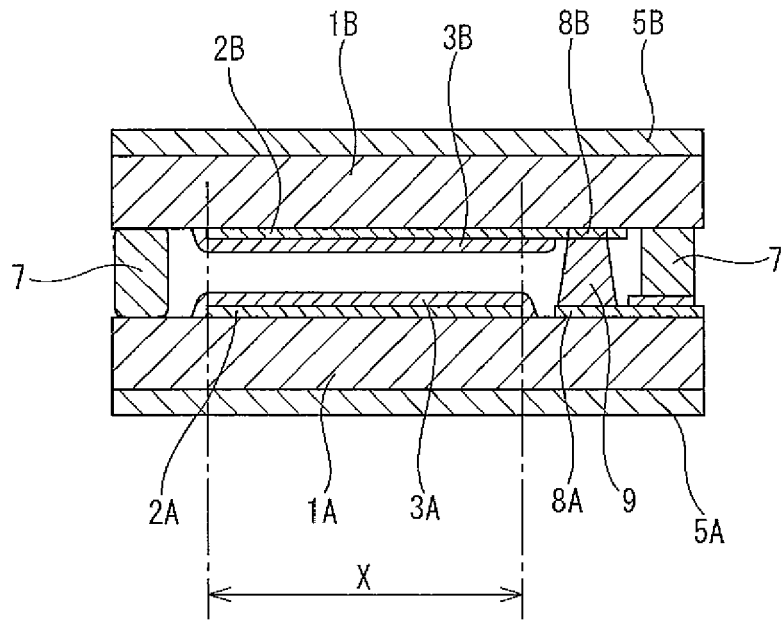
FIG. 17 is a sectional view of the conventional liquid crystal display.
Figure 18:
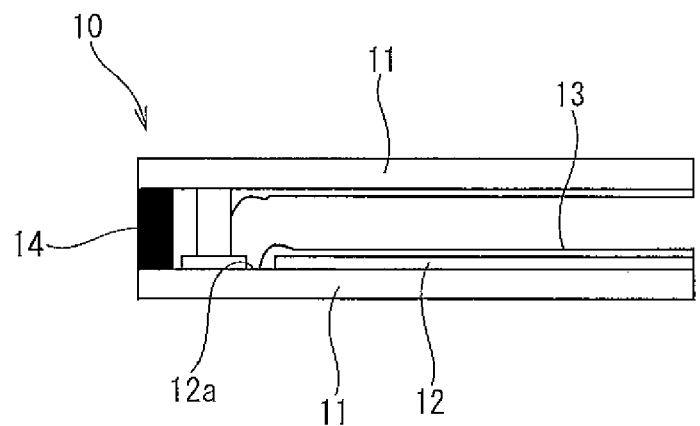
FIG. 18 shows another conventional art.

The entire construction of the liquid crystal display is similar to that shown in FIG. 17. The array substrate 30 and the CF substrate 40 are disposed by opposing them to each other at a predetermined interval spaced from each other. A peripheral edge of the array substrate 30 and that of the CF substrate 40 are joined with each other via a sealing compound 50. A liquid crystal material 4 is enclosed in a space surrounded with the array substrate 30, the CF substrate 40, and the sealing compound 50.

Figure 2:
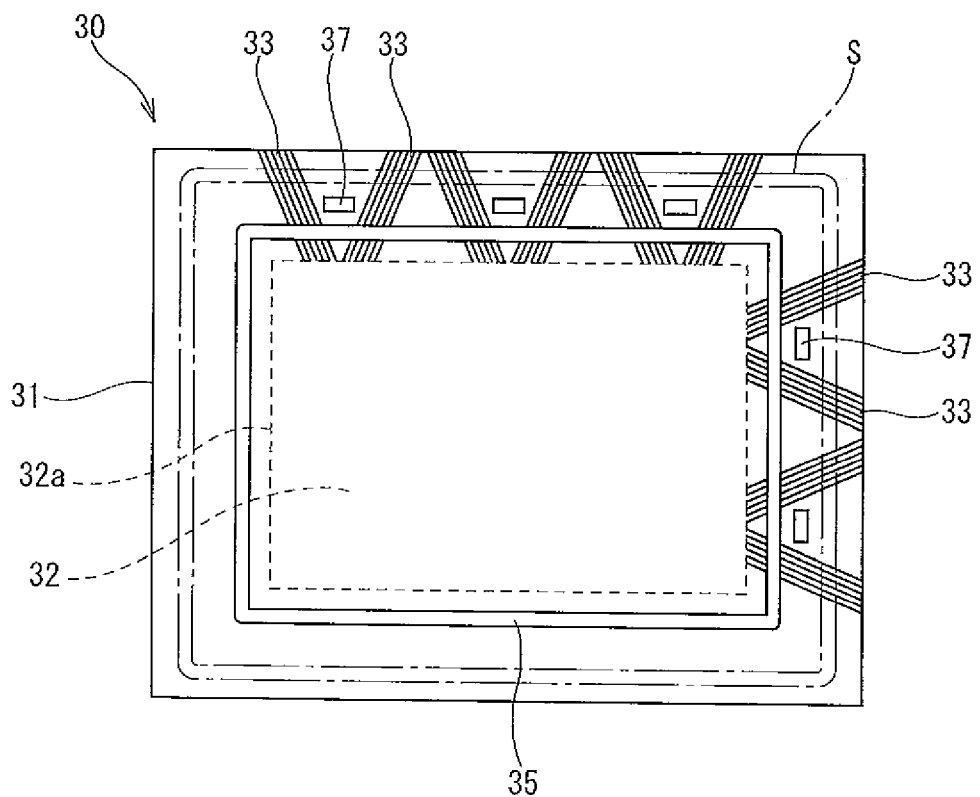
FIG. 2 is a plan view of the array substrate.

As shown in FIG. 2, in the array substrate 30, a central region of a glass substrate 31 is set as a display part 32. In the display part 32, there are provided a plurality of gate lines and source lines, both for driving pixel electrodes, disposed with the gate lines and the source lines intersecting with each other, thin film transistors disposed at crossovers, and transparent electrodes 38 for each of display pixels, consisting of ITO or the like, which are arranged in the shape of a matrix. A liquid crystal oriented film 36 (hereinafter abbreviated as oriented film 36) is formed on the surfaces of the transparent electrodes 38.

The array substrate 30 is provided with a distributing wire 33 extended from an outer edge 32a of the display part 32 to a periphery of the glass substrate 31 to connect the gate lines and the source lines provided on the display part 32 to a gate driver and a source driver (not shown in the drawings) respectively through the distributing wire 33.

Common electrodes 37 are provided between a region S where the sealing compound 50 is disposed and the outer edge 32a of the display part 32 with each of the common electrodes 37 sandwiched between adjacent portions of the distributing wire 33. The common electrodes 37 are also connected to the gate driver or the source driver through distributing wires (not shown in the drawings).

Figure 5:
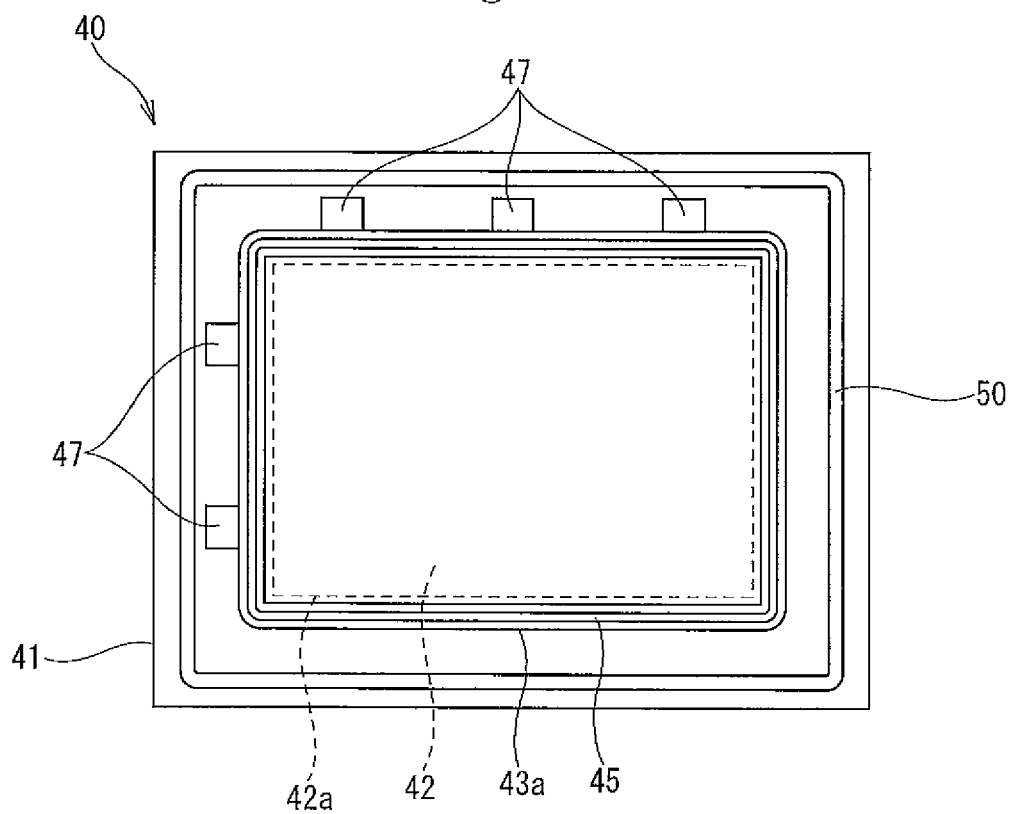
FIG. 5 is a plan view of the CF substrate.
Figure 6:
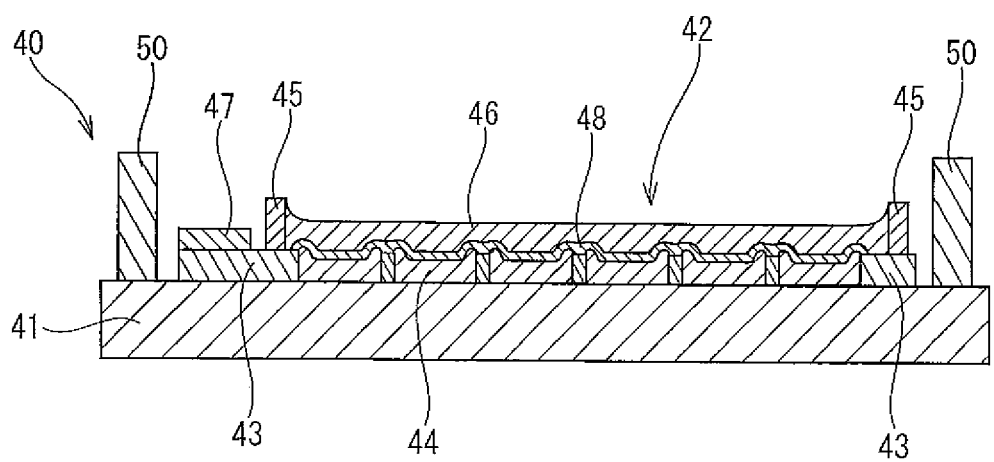
FIG. 6 is a sectional view of the CF substrate.

As shown in FIGS. 5 and 6, the CF substrate 40 is provided with black masks 43 disposed at a certain interval along an outer edge 42a of a display part 42 of a glass substrate 41 and inside the display part 42. The display part 42 is provided with color filters 44 of R, G, and B, and transparent electrodes 48.

A liquid crystal-oriented film 46 (hereinafter abbreviated as oriented film 46) is formed on the surfaces of the transparent electrodes 48. Opposed electrodes 47 are provided at positions between the outer edge 42a of the display part 42 and the periphery of the glass substrate 41 with the opposed electrodes 47 confronting the common electrodes 37 respectively to connect the opposed electrodes 47 to the transparent electrodes 48 respectively. The sealing compound 50 is provided circumferentially along the periphery of the CF substrate 40.

The array substrate 30 and the CF substrate 40 are provided with convex portions 35, 45 respectively to prevent a resin solvent to be formed as the oriented films 36, 46 from spreading to the region S1 where the sealing compound 50 is disposed, when the resin solvent is applied to a space between the region S where the seating compound 50 is disposed and the outer edge 32a of the display part 32 as well as the outer edge 42a of the display part 42.

More specifically, the array substrate 30 is provided with the convex portion 35 continuously circumferentially formed in the shape of a four-cornered frame like a bank in a region between the outer edge 32a of the display part and the region S where the sealing compound 50 is disposed and between the outer edge 32a of the display part and the common electrodes 37, with the convex portion 35 surrounding the display part 32 at a predetermined interval from the outer edge 32a of the display part 32.

The convex portion 35 is formed by applying the same resin as that forming the oriented film to the surface of the array substrate 30 after the distributing wire 33 is disposed and before the resin solvent to be formed as the oriented film is applied to the display part. It is preferable to set the height of the convex portion to 1 to 3 microns. In the first embodiment, the height of the convex portion is set to 1.4 microns.

Figure 3:
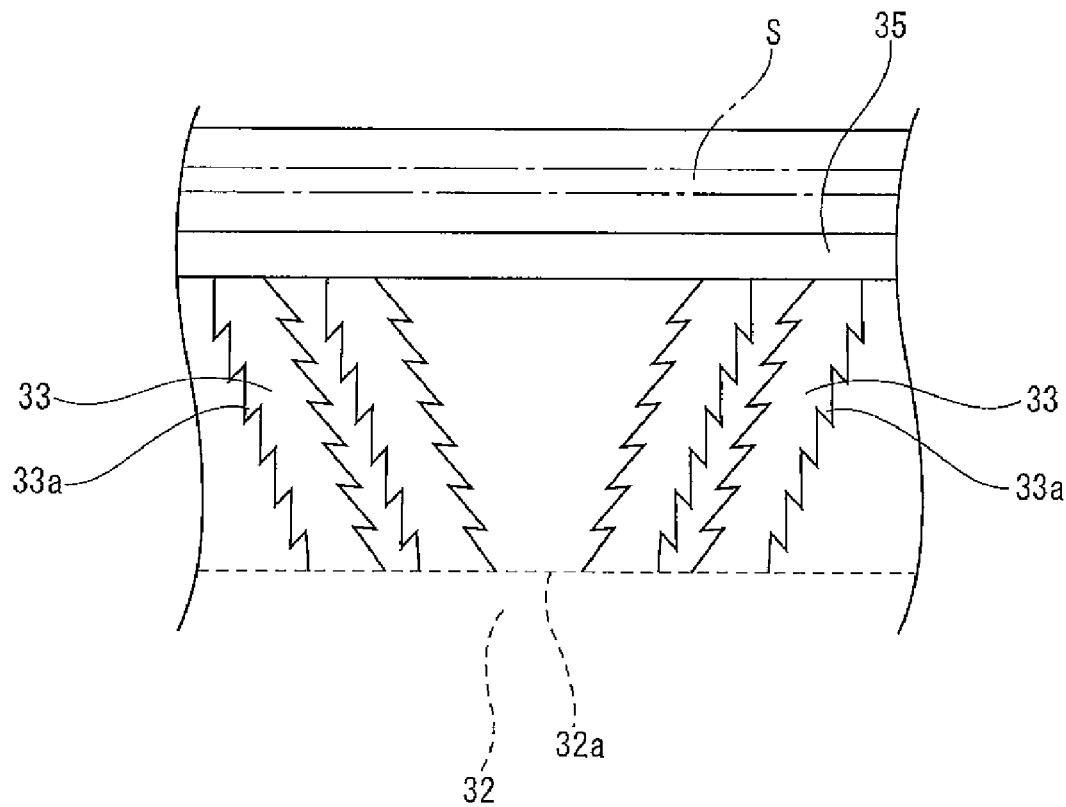
FIG. 3 is an enlarged view of a main part of a distributing wire provided on the array substrate.

As shown in FIG. 3, a saw-shaped convex portion 33a is continuously formed at both sides of an insulation cover of a portion of the distributing wire 33 disposed between the outer edge 32a of the display part 32 and the convex portion 35. As shown in FIG. 3, the convex portion 33a is projected toward the display part 32 so that the resin solvent, to be formed as the oriented film, which has flowed from the display part 32a flows into the space between the adjacent convex portions 33a and stays there.

Similarly to the array substrate 30, in the CF substrate 40, on the black mask 43 surrounding the outer edge 42a of the display part 42, there is provided the convex portion 45 continuous in the shape of a four-cornered frame in the direction in which the black mask 43 is extended. The height of the convex portion 45 from an upper end surface of the black mask 43 is set to 1.4 microns. Similarly to the convex portion 35 of the array substrate 30, the convex portion 45 is made of the same resin as that forming the oriented film. The material to be molded into the convex portions 35, 45 is not limited to the same material as that forming the oriented film.

As described above, the convex portions 35, 45 are formed on the array substrate 30 and the CF substrate 40 respectively, after the distributing wire 33 is disposed and before the oriented films 36, 46 are formed.

Therefore when the resin solvent to be formed as the oriented film is applied to the display parts 32, 42 by an ink jet method at the step of forming the oriented film 36 on the array substrate 30 and the oriented film 46 on the CF substrate 40, it is possible to prevent the resin solvent from spreading to the region S where the sealing compound is disposed.

Figure 4:
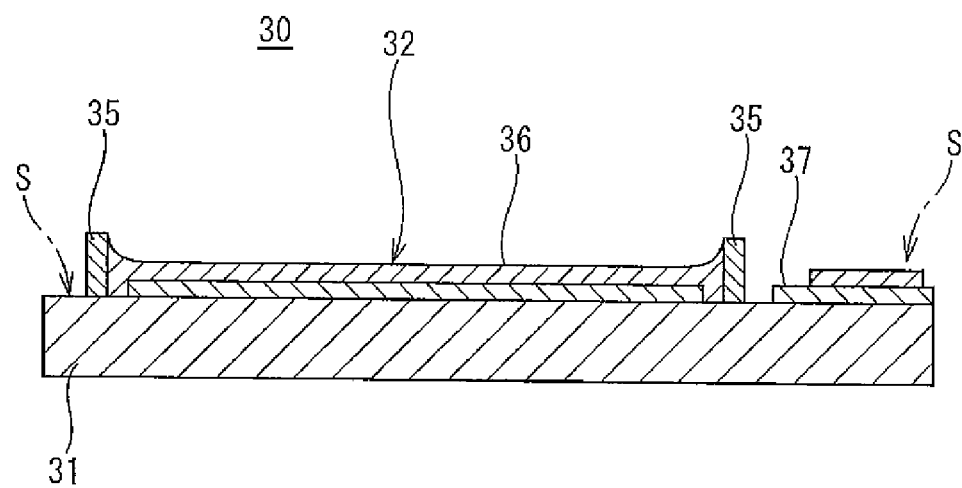
FIG. 4 is a sectional view of the array substrate.

That is, the viscosity of the resin solvent is comparatively low. Thus the resin solvent will spread outward beyond the outer edges 32a, 42a of the display parts 32, 42, after the resin solvent is applied to the display parts 32, 42. But as shown in FIG. 4, the convex portions 35, 45 intercept the flow of the resin solvent, thus preventing the resin solvent from reaching the region S where the sealing compound 50 is disposed.

At the portion of the array substrate 30 where the distributing wire 33 is disposed, the convex portion 33a formed on the distributing wire 33 restrains the flow of the resin solvent to be formed as the oriented film 36, thus forcing the resin solvent to stay between the adjacent convex portions 33a along the distributing wire 33 and securely preventing it from flowing to the region S where the sealing compound 50 is disposed.

After the oriented films 36, 46 are formed on the display parts 32, 42 respectively in the above-described manner, the liquid crystal material 4 is dripped to the region surrounded with the sealing compound 50 disposed at the side of the CF substrate 40. Thereafter the array substrate 30 is mounted on the CF substrate 40. At this time, a portion of the sealing compound 50 projected from the side of the CF substrate 40 is brought into contact with the region S where the sealing compound disposed 50 at the side of the array substrate 30 is disposed. As shown in FIG. 1, the common electrodes 37 of the array substrate 30 and the opposed electrodes 47 of the CF substrate 40 are connected with each other respectively through a conductive material 51.

In the above-described construction, because it is possible to prevent the resin solvent to be formed as the oriented films 36, 46 from spreading to the position where the sealing compound 50 is disposed when the resin solvent is applied to the display parts, it is possible to prevent a resin film (oriented film) from being formed in the region where the sealing compound 50 is disposed. Thereby with the sealing compound 50, it is possible to securely seal the gap between the array substrate 30 and the CF substrate 40 disposed in confrontation.

Because the convex portions 35, 45 are disposed nearer to the display parts 32, 42 than the common electrodes 37 and the opposed electrodes 47, it is possible to prevent the applied oriented films 36, 46 from spreading to the common electrodes 37 and the opposed electrodes 47. Thus when the array substrate 30 and the CF substrate 40 are disposed in confrontation, it is possible to securely connect the electrodes 37, 47 of the substrates 30, 40 to each other respectively through the conductive material 51.

Because the convex portion 33a is formed on the distributing wire 33 of the array substrate 30, the convex portion 33a restrains the flow of the resin solvent to be formed as the oriented film. Thereby it is possible to restrain the resin solvent from reaching the position where the sealing compound 50 is disposed.

In the first embodiment, the sealing compound 50 is provided on the entire circumference of the CF substrate 40. But the CF substrate 40 may be so constructed that the circumference thereof may be partly open to form an open portion as an injection opening for a liquid crystal so that after the liquid crystal is injected to the open portion, the open portion of the sealing compound 50 is closed. In this case, the convex portion is not formed at a position opposed to the open portion of the sealing compound.

Figure 7:
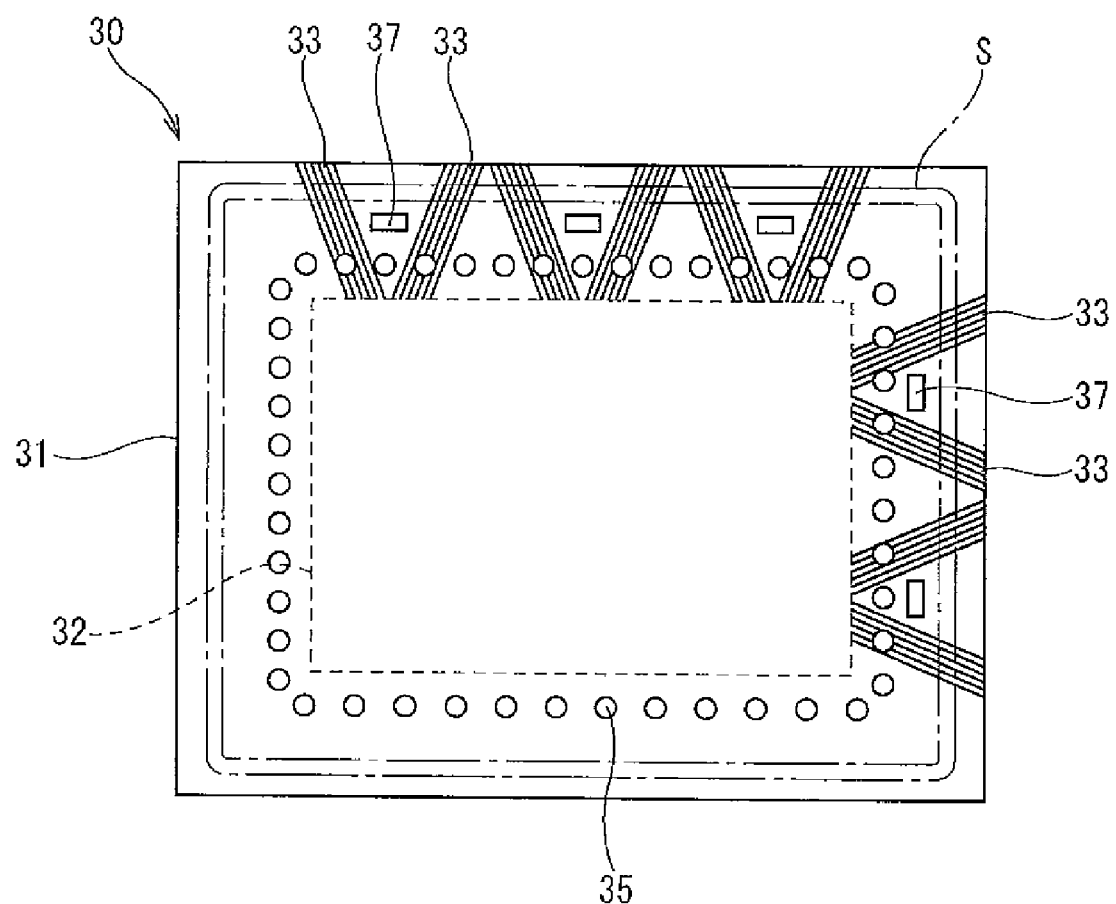
FIG. 7 shows a first modification of the first embodiment.

FIG. 7 shows a first modification of the first embodiment having the convex portion 35 formed to prevent the spread of the resin solvent to be formed as the oriented film.

The convex portion 35 of the first modification formed on the array substrate 30 is different from that of the first embodiment. The convex portion 35 is not continuous circumferentially, but columnar convex portions 35 are circumferentially formed at certain intervals, namely, uncontinuously.

In the above-described construction, although gaps are formed between the adjacent convex portions 35, the resin solvent to be formed as the oriented film sticks to the convex portions 35 owing to a surface tension. Thus it is possible to prevent the resin solvent from spreading beyond the convex portions 35 to the sealing compound and the electrodes. Similarly to the convex portions 35, convex portions 46 of the CF substrate 40 may be also formed as uncontinuous convex portions The first modification has the same construction as that of the first embodiment. Thus the same parts of the first modification as those of the first embodiment are denoted by the same reference numerals as those of the first embodiment, and description thereof is omitted herein.

Figure 8:
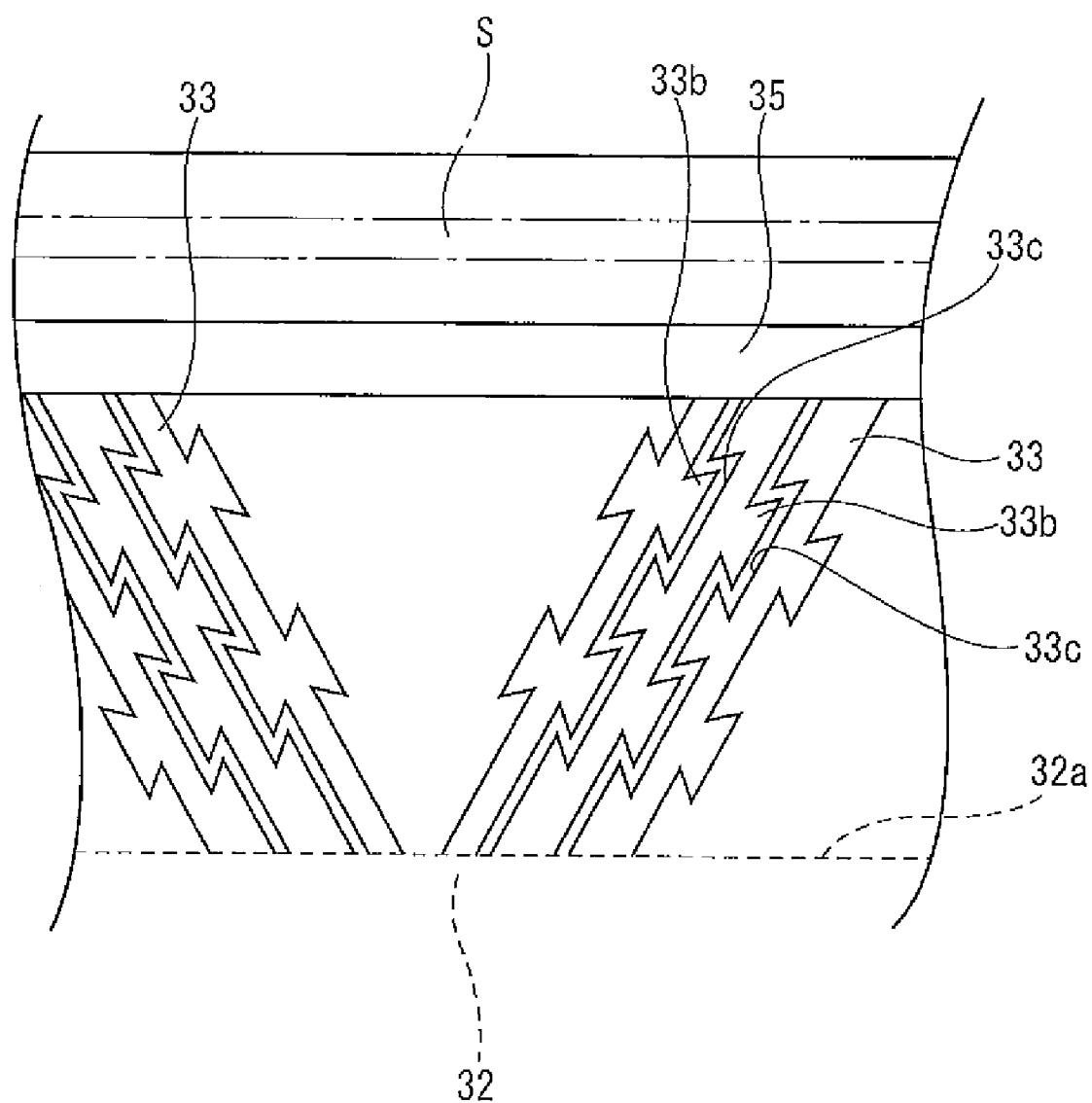
FIG. 8 shows a second modification of the first embodiment.

FIG. 8 shows a second modification of the first embodiment.

In the second modification, the configuration of the distributing wire 33 formed on the array substrate 30 is different from that of the first embodiment. A dovetail-shaped concave portion 33c is formed on one surface of an insulation cover of the distributing wire 33, whereas an inverse trapezoidal convex portion 33b which engages the concave portion 33c is formed on the other surface of the insulation cover of the distributing wire 33 with a gap formed therebetween so that the convex portion 33b of one distributing wire 33 and the concave portion 33c of the adjacent distributing wire 33 engage each other.

The above-described construction is capable of securely restraining the flow of the resin solvent, to be formed as the oriented film, which has flowed to the gap between the convex portion 33b and the concave portion 33c which has engaged the convex portion 33b.

Figure 9:
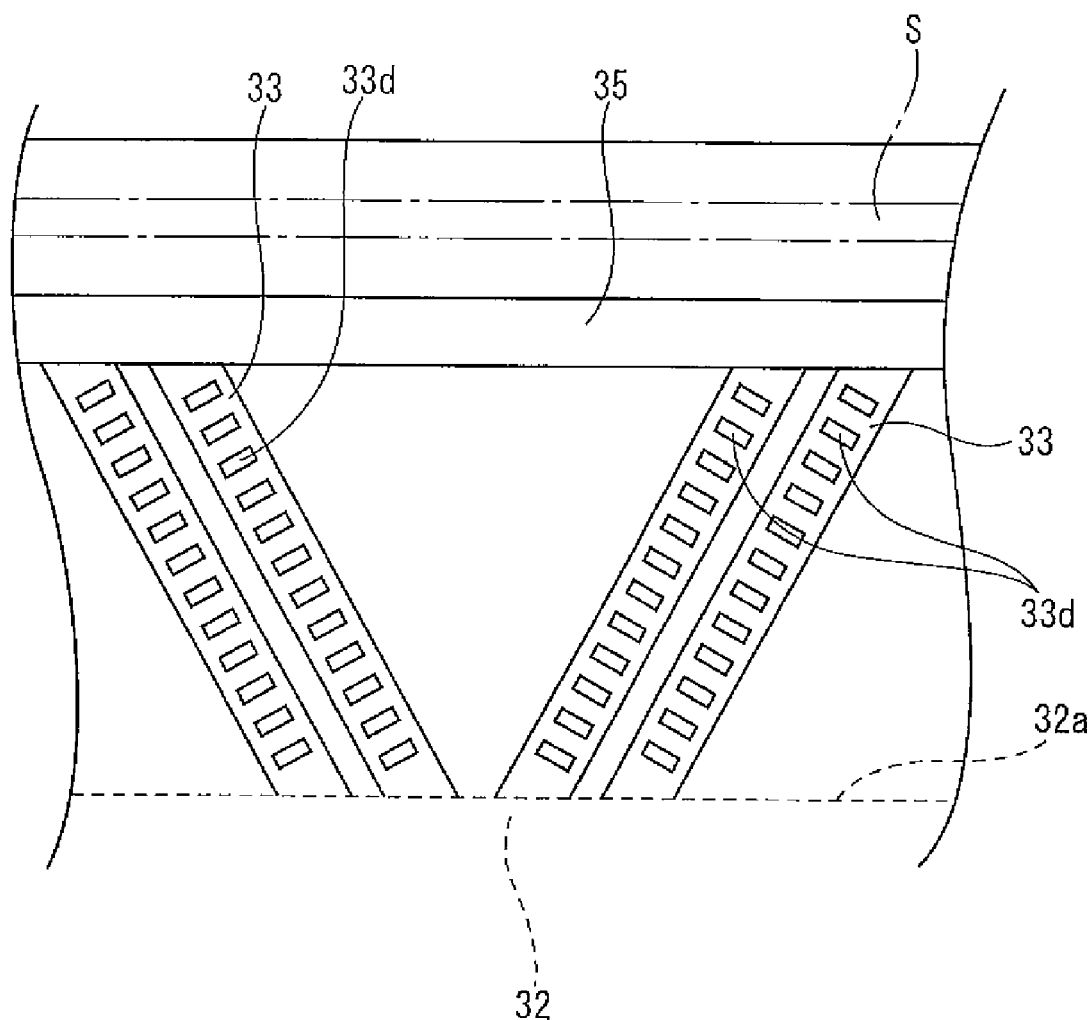
FIG. 9 shows a third modification of the first embodiment.

FIG. 9 shows a third modification of the first embodiment.

In the third modification, a flat cable is used as the distributing wire 33 of the array substrate 30. The distributing wire 33 is covered with a pair of upper and lower insulation sheets with a conductor disposed at both sides of the distributing wire 33 in the widthwise direction thereof. Holes 33d are formed on a bonded portion of the insulation sheets disposed at the widthwise center thereof with the holes 33d spaced at certain intervals in the longitudinal direction of the distributing wire 33.

In the above-described construction, the resin solvent to be formed as the oriented film flows along the surface of the distributing wire 33 and stays at the holes 33d. Thereby it is possible to restrain the flow of the resin solvent.

Figure 10:
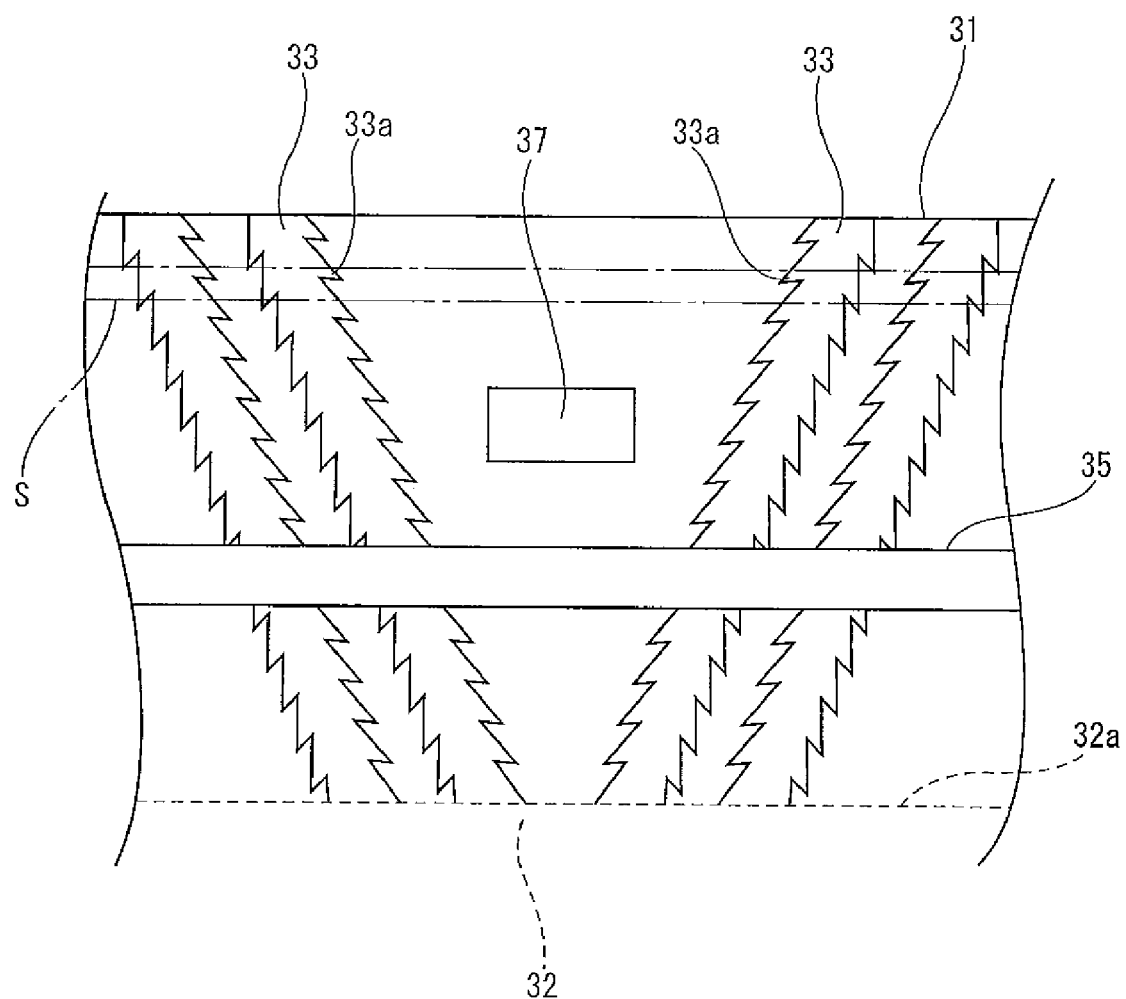
FIG. 10 shows a fourth modification of the first embodiment.

FIG. 10 shows a fourth modification of the first embodiment.

In the fourth modification, the convex portion 33a formed on the distributing wire 33 of the array substrate 30 is disposed not only in the region from the outer edge 32a of the display part 32 to the convex portion 35, but also in an entire region from the outer edge 32a of the display part 32 to the outer edge of the glass substrate 31.

In the above-described construction, even though the applied resin solvent to be formed as the oriented film rides across the convex portion 35 and spreads to the region S where the sealing compound is disposed and the common electrode 37, the convex portion 33a of the distributing wire 33 is capable of restraining the flow of the oriented film even in a region at a peripheral side of the convex portion 35.

The distributing wire 33 of the second and third modifications may be provided in the entire region from the outer edge of the display part 32 to the outer edge of the glass substrate 31.

Figure 11:
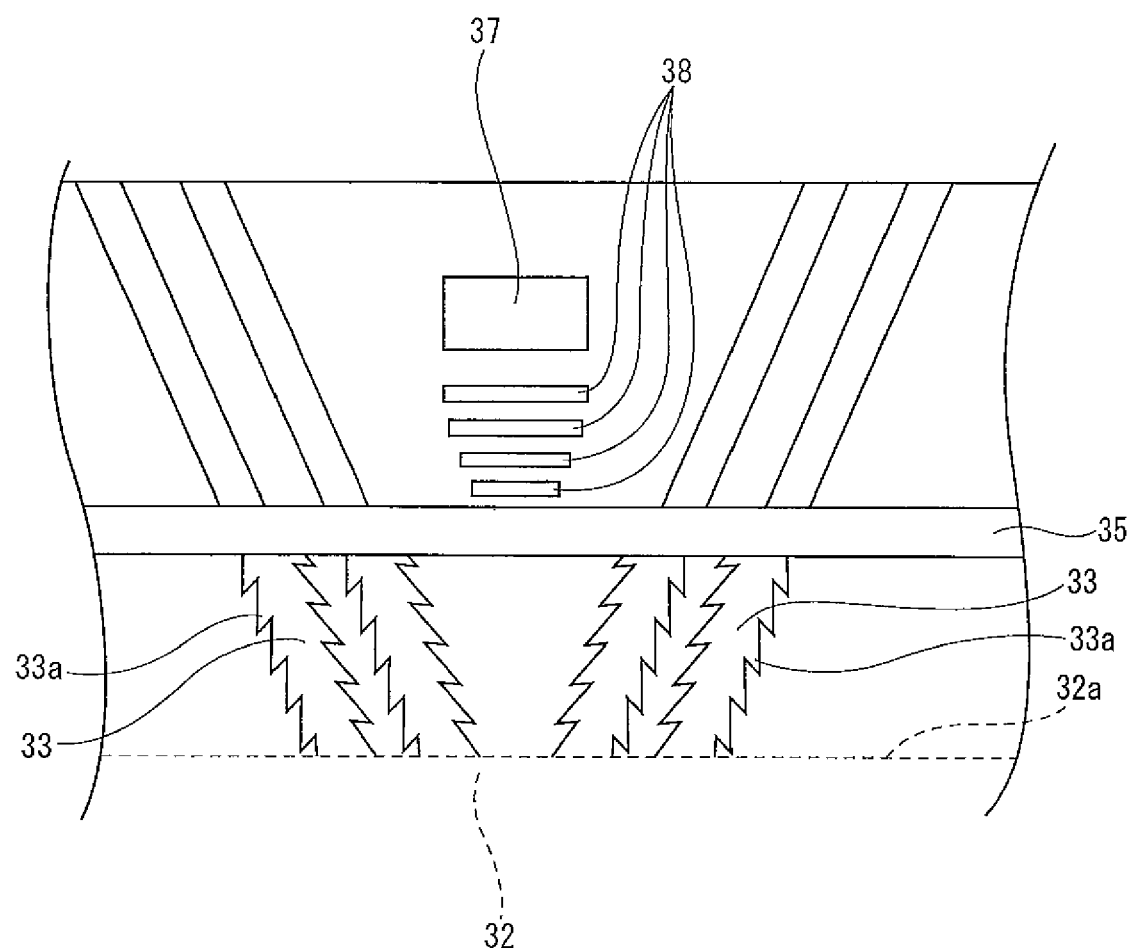
FIG. 11 shows a fifth modification of the first embodiment.

FIG. 11 shows a fifth modification of the first embodiment.

In the fifth modification, a plurality of linear convex portions 38 made of the same material as that for the distributing wire 33 is arranged side by side between the outer edge 32a of the display part 32 and the common electrode 37. The convex portions 38 and the distributing wire 33 do not contact each other.

In the above-described construction, because the linear convex portions 38 are arranged side by side between the display part 32 and the common electrode 37, it is possible to securely prevent the resin solvent to be formed as the oriented film from spreading to the common electrode 37. Because the linear convex portions 38 are made of the same conductive material as that for the distributing wire 33, the linear convex portions 38 can be formed at the step at which the distributing wire 33 is formed.

The linear convex portions 38 may be made of resin, similarly to the convex portion 35 of the first embodiment.

In the first embodiment, the flow of the resin solvent to be formed as the oriented film is restrained and prevented by the bank-shaped convex portion 35 and the convex portion (or concave portion, hole) 33a formed on the surface of the insulation cover of the distributing wire 33. Both does not necessarily have to be formed, and only the convex portion 35 may be formed or convex and concave portions may be formed on the surface of the insulation cover of the distributing wire 33 without forming the convex portion 35.

Figure 12:
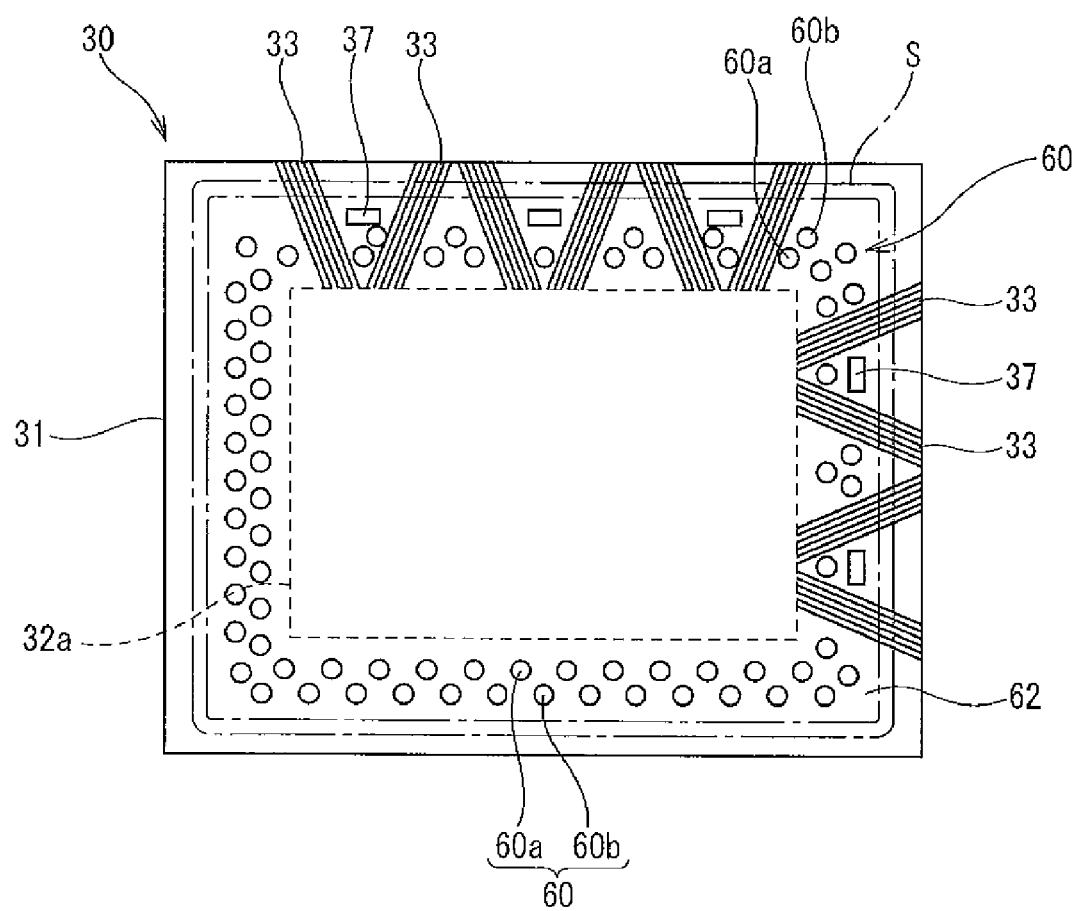
FIG. 12 is a plan view of a TFT array substrate of a second embodiment.
Figure 13:
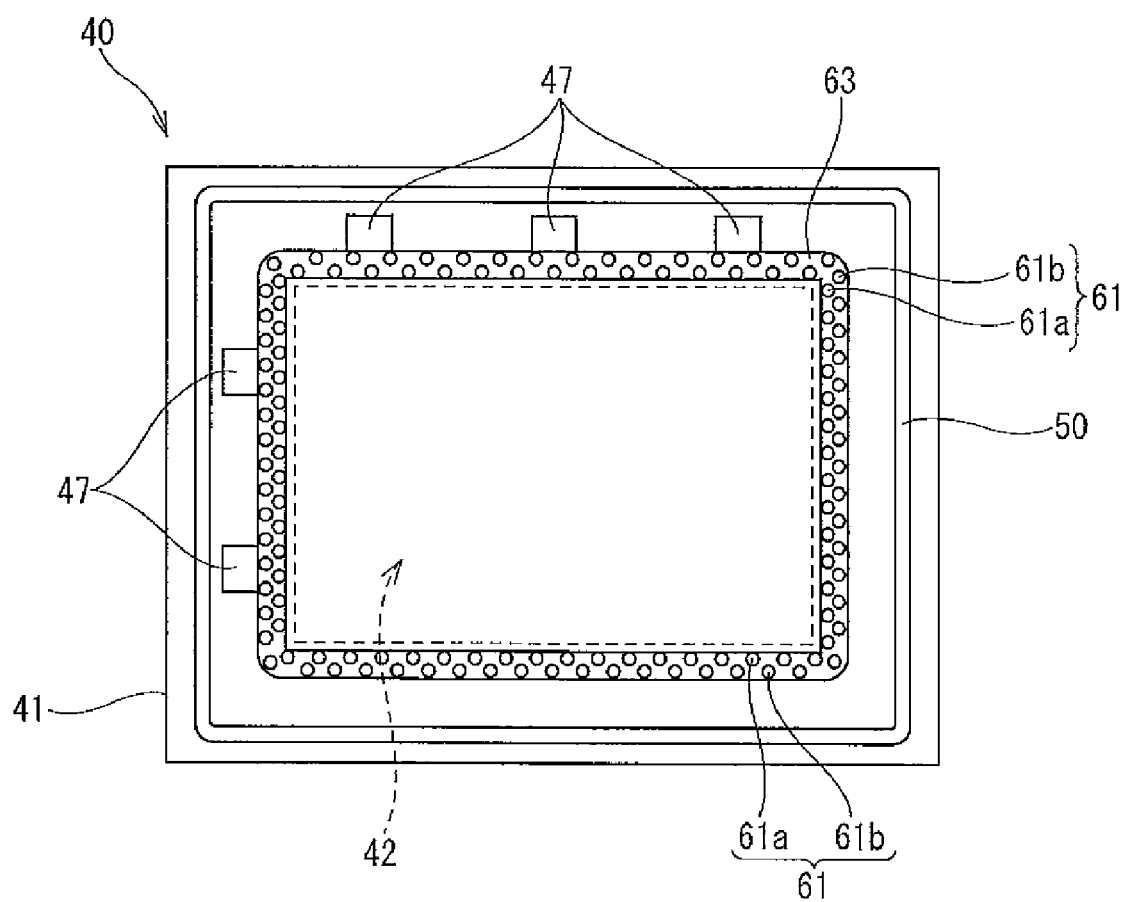
FIG. 13 is a plan view of a color filter substrate of the second embodiment.

FIGS. 12 and 13 show a second embodiment of the present invention.

In the second embodiment, instead of the convex portions 35, 45 formed on the array substrate 30 and the CF substrate 40 respectively, independent semicircular concave portions 60 (60a, 60b) and 61 (61a, 61b) are formed zigzag in two rows on the array substrate 30 and the CF substrate 40 respectively. More specifically, the concave portions 60a, 60b and the concave portions 61a, 61b are densely zigzag disposed at positions where a part of the concave portions 60a, 60b and the concave portions 61a, 61b overlap each other respectively.

In the concave portion 60 of the array substrate 30 shown in FIG. 12, between the outer edge 32a of the display part 32 and the region where the sealing compound 50 is disposed and in the portion where the common electrodes 37 are disposed, a resin film 62 is formed between the common electrodes 37 and the outer edge 32a of the display part 32. The concave portion 60 is formed on the resin film 62.

Similarly to the array substrate 30, in the CF substrate 40 shown in FIG. 13, between the outer edge 42a of the display part 42 and in the region S where the sealing compound 50 is disposed and in the region where the opposed electrodes 47 are disposed, a resin film 63 is formed between the opposed electrodes 47 and the outer edge 42a of the display part 42. The concave portion 61 is formed on the resin film 63.

As the resin for the resin films 62, 63, the same resin as that for forming the oriented film or other appropriate resin may be used. Holes may be formed instead of the concave portions 60, 61.

In the above-described construction, the independent semicircular concave portions 60 (60a, 60b) and 61 (61a, 61b) are formed zigzag in two rows on the array substrate 30.

Therefore even though the resin solvent to be formed as the oriented film rides across one concave portion 60a, the resin solvent enters the concave portion 60b overlapping the concave portion 60a. Thus it is possible to prevent the resin solvent from reaching the region S where the sealing compound 50 is disposed and the common electrodes 37.

Similarly to the array substrate 30, in the CF substrate 40, even though the resin solvent to be formed as the oriented film rides across one concave portion 61a, the resin solvent enters the concave portion 61b overlapping the concave portion 61a. Thus it is possible to prevent the resin solvent from reaching the region S where the sealing compound 50 is disposed and the common electrodes 37.

The second embodiment has the same construction as that of the first embodiment. Thus the same parts of the second embodiment as those of the first embodiment are denoted by the same reference numerals as those of the first embodiment, and description thereof is omitted herein.

In the second embodiment, the concave portions 60, 61 are formed zigzag in two rows respectively, but may be formed in not less than three rows respectively.

Figure 14:
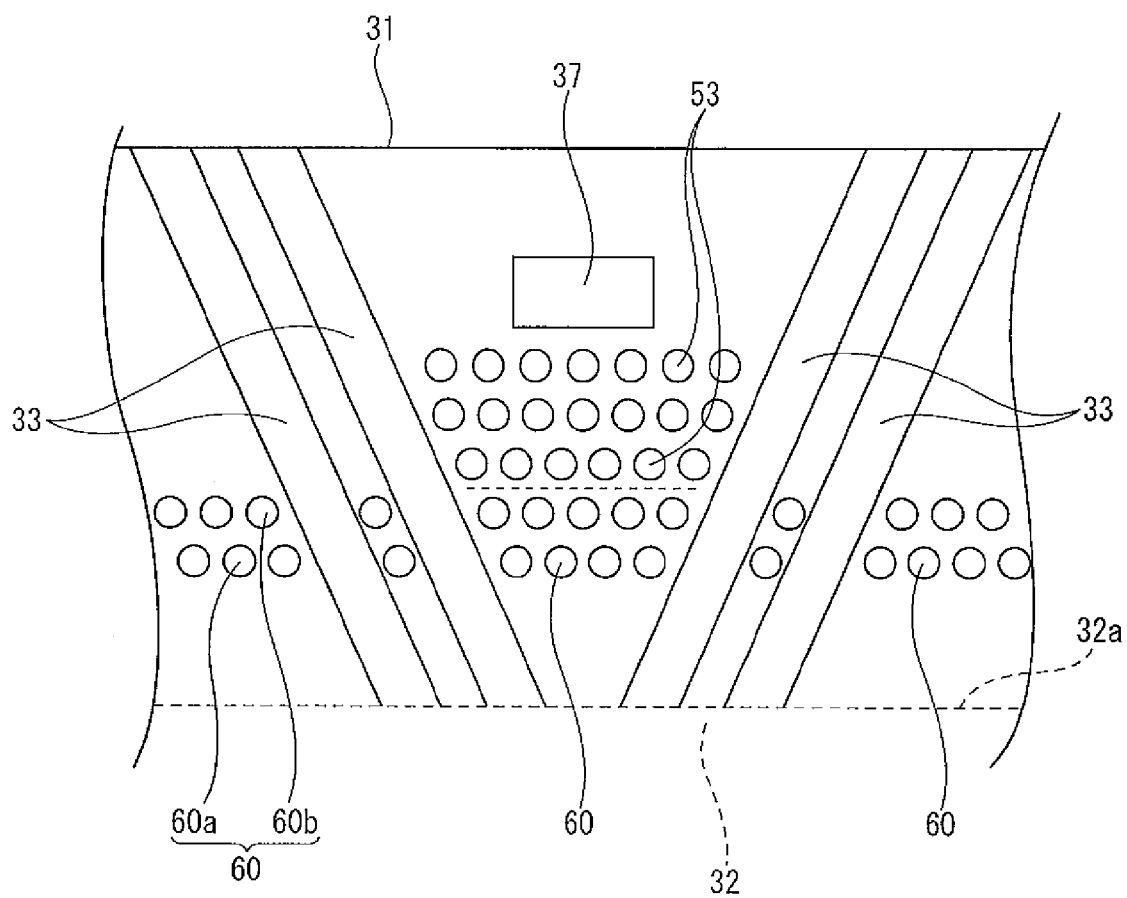
FIG. 14 shows a modification of the second embodiment.

FIG. 14 shows a modification of the second embodiment.

In the modification, a plurality of independent concave portions 53 is densely dotted between the outer edge 32a of the display part 32 and the common electrode 37. The above-described construction is capable of more securely preventing the resin solvent to be formed as the oriented film from spreading to the common electrode 37.

Similarly to the array substrate 30, in the CF substrate 40, a plurality of concave portions may be dotted between the opposed electrode 47 and the outer edge 42a of the display part 42.

Figure 15:
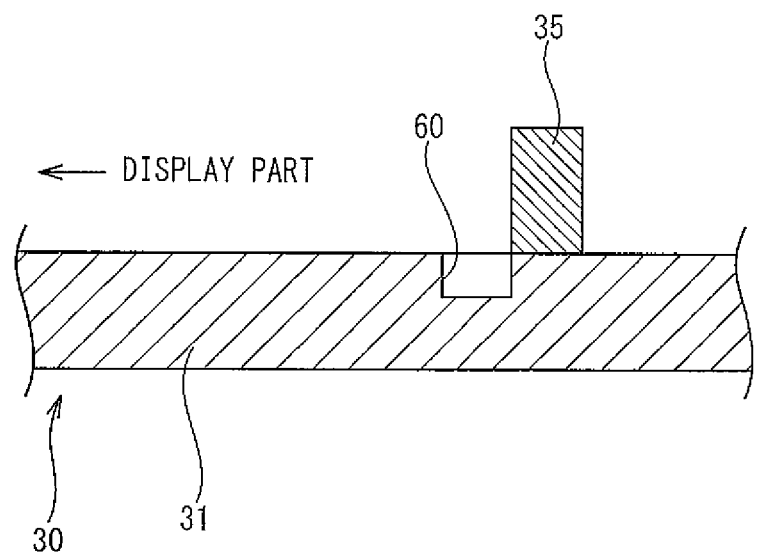
FIG. 15 shows a third embodiment.
Figure 16:
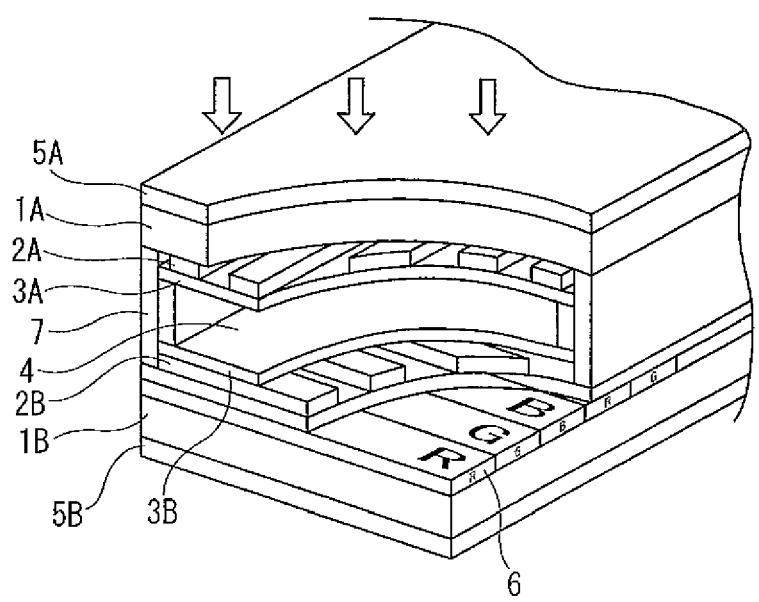
FIG. 16 is a perspective view of a conventional liquid crystal display.

FIG. 15 shows a third embodiment of the present invention.

In the third embodiment, the bank-shaped convex portion 35 is formed on the array substrate 30, and an independent concave portion 60 is formed adjacently to the outer edge of the convex portion 35 at the side of the display part thereof.

The above-described construction is similar to a construction of a bank having a depth equal to the addition of the height of the convex portion 35 and the depth of the concave portion 60, thus securely intercepting the flow of the resin solvent forming the oriented film. Similarly to the array substrate 30, the CF substrate may be provided with the convex portion 35 and the concave portion 60 disposed adjacently thereto.

The third embodiment has the same construction as that of the first embodiment. Thus the same parts of the third embodiment as those of the first embodiment are denoted by the same reference numerals as those of the first embodiment, and description thereof is omitted herein.

In all of the above-described embodiments and the modifications, the convex portions having similar configurations and the concave portions having similar configurations are formed on the array substrate and the CF substrate. But the convex portion and the concave portion do not necessarily have to have the same configuration respectively.

The present invention is not limited to the above-described embodiments and modifications, but can be embodied in various modes within the technical scope of the present invention.

What is claimed is:

1. A substrate for a display, comprising:
   on a surface of said substrate,
   a sealing compound disposed along a periphery of said substrate spaced at a predetermined interval from an outer edge of a display part to which an oriented film is applied;
   a first convex portion, for preventing said applied oriented film from spreading to said sealing compound, provided between said sealing compound and said outer edge of said display part;
   an electrode disposed between said sealing compound and said outer edge of said display part;

a second convex portion, for preventing said applied oriented film from spreading to said electrode, provided between said electrode and said outer edge of said display part;
a distributing wire wired in a range from said display part to a peripheral edge of said substrate with said distributing wire disposed at both sides of said electrode, and
a third convex portion, for restraining an oriented film applied to a display part from flowing, formed on a portion of said distributing wire extended from said outer edge of said display part to said sealing compound,
wherein said first convex portion has a configuration of a bank continuous or uncontinuous, and
wherein said second convex portion has a configuration of a bank continuous or uncontinuous.

2. The substrate for a display according to claim 1, wherein said first convex portion is made of a resin film provided between said sealing compound and said outer edge of said display part; and a substrate having said first convex portion formed thereon consists of one or both of substrates opposed to each other with said sealing compound interposed therebetween.

3. The substrate for a display according to claim 1, wherein said substrate is an array substrate; said electrode is a common electrode; and said second convex portion is made of the same material as that for said distributing wire provided on said array substrate.

4. The substrate for a display according to claim 1, wherein said first convex portion is disposed in a region in which a black mask surrounding said outer edge of said display part is disposed such that said first convex portion is present along an entire circumference inside said region.

5. The substrate for a display according to claim 1, wherein said second convex portion is disposed in a region in which a black mask surrounding said outer edge of said display part is disposed such that said second convex portion is present along an entire circumference inside said region.

6. The display, comprising:
a substrate for a display according to claim 1.

7. A substrate for a display, comprising:
on a surface of said substrate,
a sealing compound disposed along a periphery of said substrate spaced at a predetermined interval from an outer edge of a display part to which an oriented film is applied;
an electrode disposed between said sealing compound and said outer edge of said display part;
a first convex portion, for preventing said applied oriented film from spreading to said electrode, provided between said electrode and said outer edge of said display part;
a distributing wire wired in a range from said display part to a peripheral edge of said substrate with said distributing wire disposed at both sides of said electrode, and
a second convex portion, for restraining an oriented film applied to a display part from flowing, formed on a portion of said distributing wire extended from said outer edge of said display part to said sealing compound,
wherein said second convex portion has a configuration of a bank continuous or uncontinuous.

* * * * *